US 12,083,996 B2

(12) United States Patent
Takano et al.

(10) Patent No.: US 12,083,996 B2
(45) Date of Patent: Sep. 10, 2024

(54) STORAGE DEVICE FOR VEHICLE

(71) Applicant: MORIROKU TECHNOLOGY COMPANY, LTD., Tokyo (JP)

(72) Inventors: Masatoshi Takano, Tokyo (JP); Song Hong, Tokyo (JP)

(73) Assignee: MORIROKU TECHNOLOGY COMPANY, LTD., Tokyo (JP)

( * ) Notice: Subject to any disclaimer, the term of this patent is extended or adjusted under 35 U.S.C. 154(b) by 324 days.

(21) Appl. No.: 17/724,870

(22) Filed: Apr. 20, 2022

(65) Prior Publication Data
US 2022/0340084 A1  Oct. 27, 2022

(30) Foreign Application Priority Data

Apr. 22, 2021  (JP) .................................. 2021-072898

(51) Int. Cl.
    B60R 7/04      (2006.01)
    E05D 11/06    (2006.01)
    E05F 1/12      (2006.01)
    E05D 3/02      (2006.01)
(52) U.S. Cl.
    CPC ................ B60R 7/04 (2013.01); E05D 11/06 (2013.01); E05F 1/1207 (2013.01); *E05D 3/02* (2013.01); *E05Y 2201/484* (2013.01); *E05Y 2900/538* (2013.01)
(58) Field of Classification Search
    CPC .. B60R 7/04; B60R 7/06; E05F 1/1207; E05D 3/02; E05Y 2201/484
    USPC .................................. 296/37.8, 37.12, 24.34
    See application file for complete search history.

(56) References Cited

U.S. PATENT DOCUMENTS

| 7,025,225 B2 * | 4/2006 | Inari | .......................... B60R 7/06 220/264 |
| 7,243,970 B2 * | 7/2007 | Kogami | .................... B60R 7/04 296/37.9 |
| 7,731,254 B2 * | 6/2010 | Lota | .......................... B60R 7/04 248/311.2 |

FOREIGN PATENT DOCUMENTS

| JP | 2000-272426 | | 10/2000 | |
| JP | 2005-247232 A | | 9/2005 | |
| JP | 2008-133680 A | | 6/2008 | |
| KR | 10-2007-0095538 A | | 10/2007 | |
| WO | WO-2005035303 A1 * | 4/2005 | ........... B60N 2/4606 |

OTHER PUBLICATIONS

Japanese Office Action dated Feb. 14, 2023 issued in corresponding Japanese application No. 2021-072898; English machine translation included (9 pages).

* cited by examiner

*Primary Examiner* — Joseph D. Pape
(74) *Attorney, Agent, or Firm* — Rankin, Hill & Clark LLP

(57) ABSTRACT

A storage device for vehicle includes: a storage portion of which one surface is an opening and which stores a storage item inside; a shaft portion provided in the storage portion; a lid swingably supported by the shaft portion to open and close at least a part of the opening; a coil spring that biases the lid in an opening direction; and a stopper integrally formed with the storage portion to restrict displacement of the coil spring when an opening degree of the lid reaches a predetermined opening degree.

2 Claims, 13 Drawing Sheets

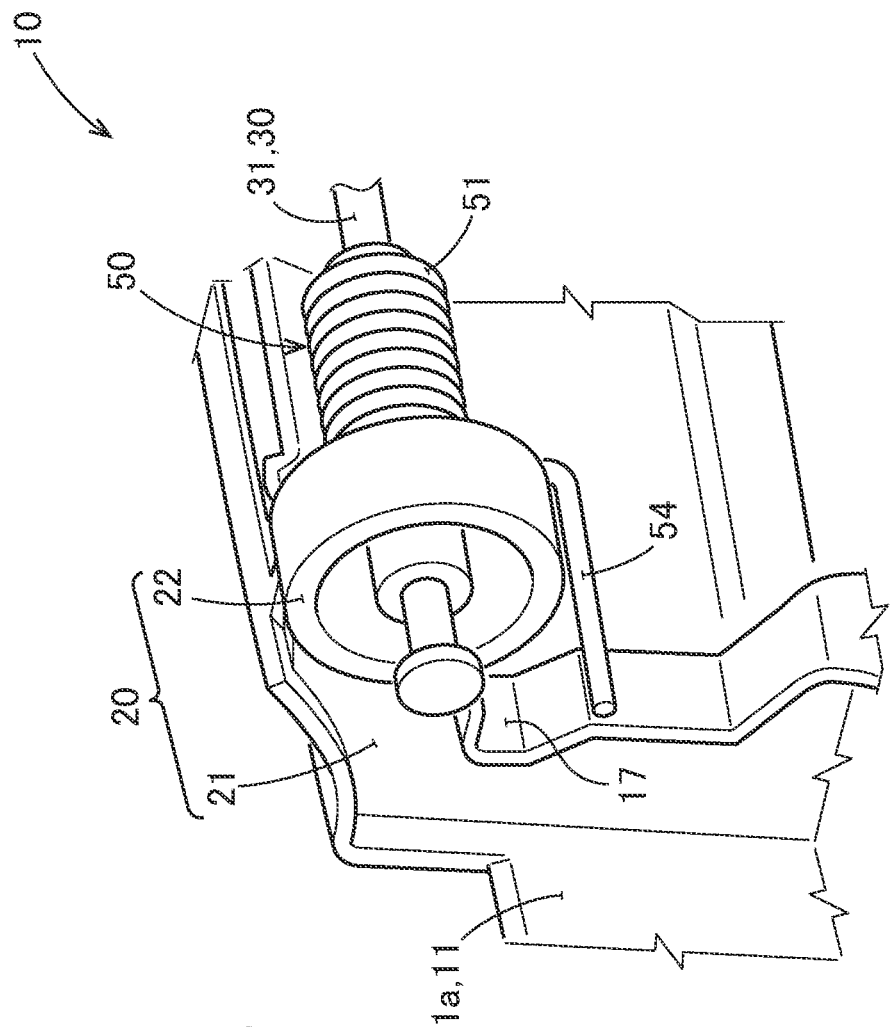
FIG.3
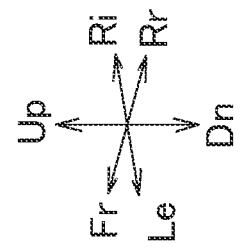

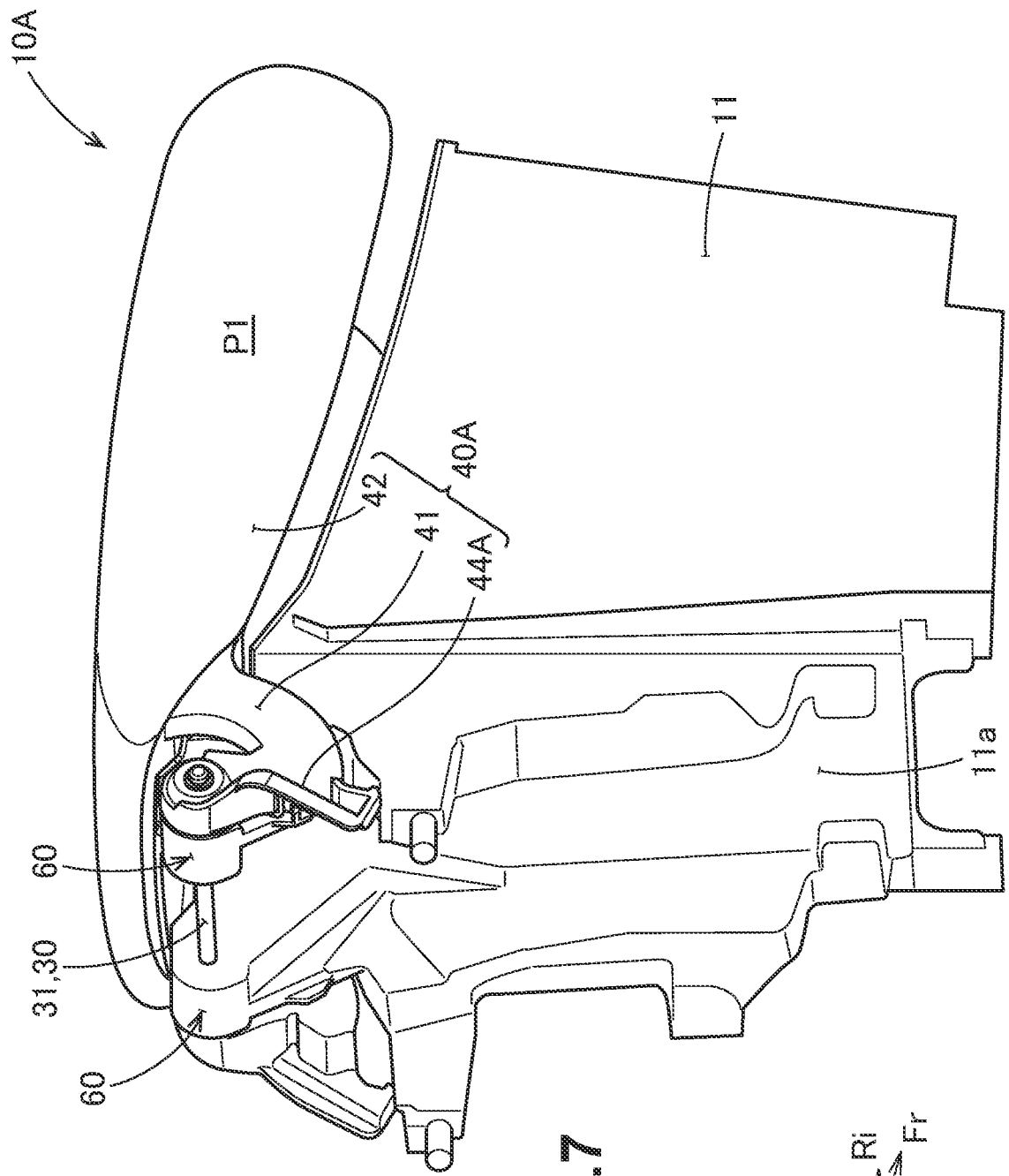
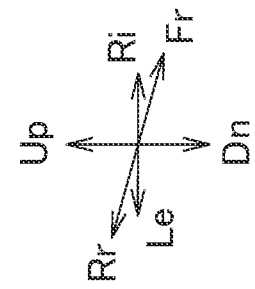
FIG.7

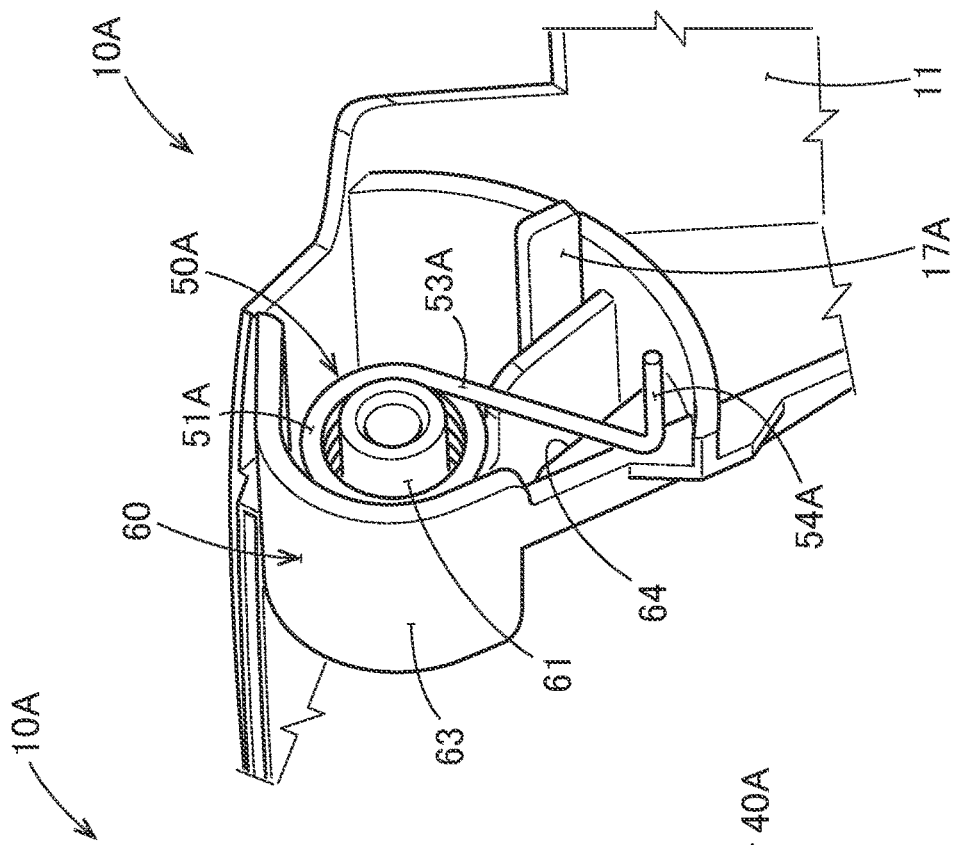
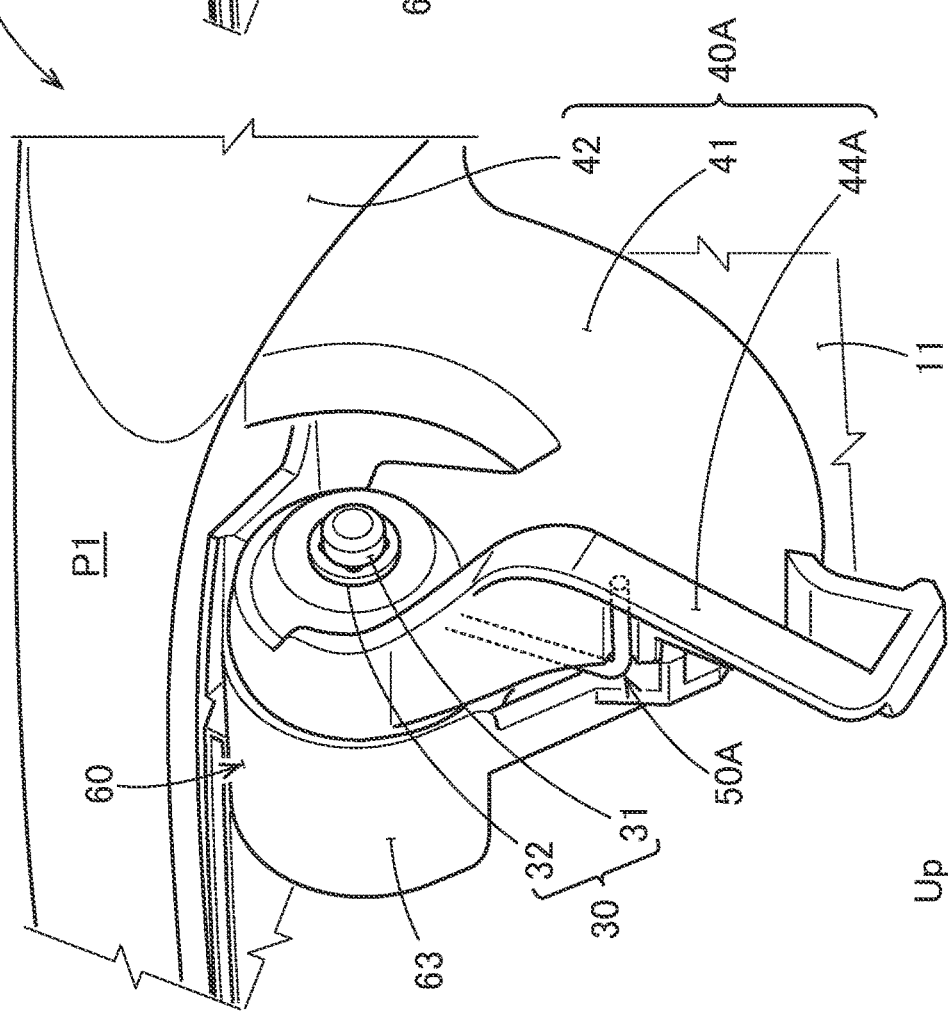

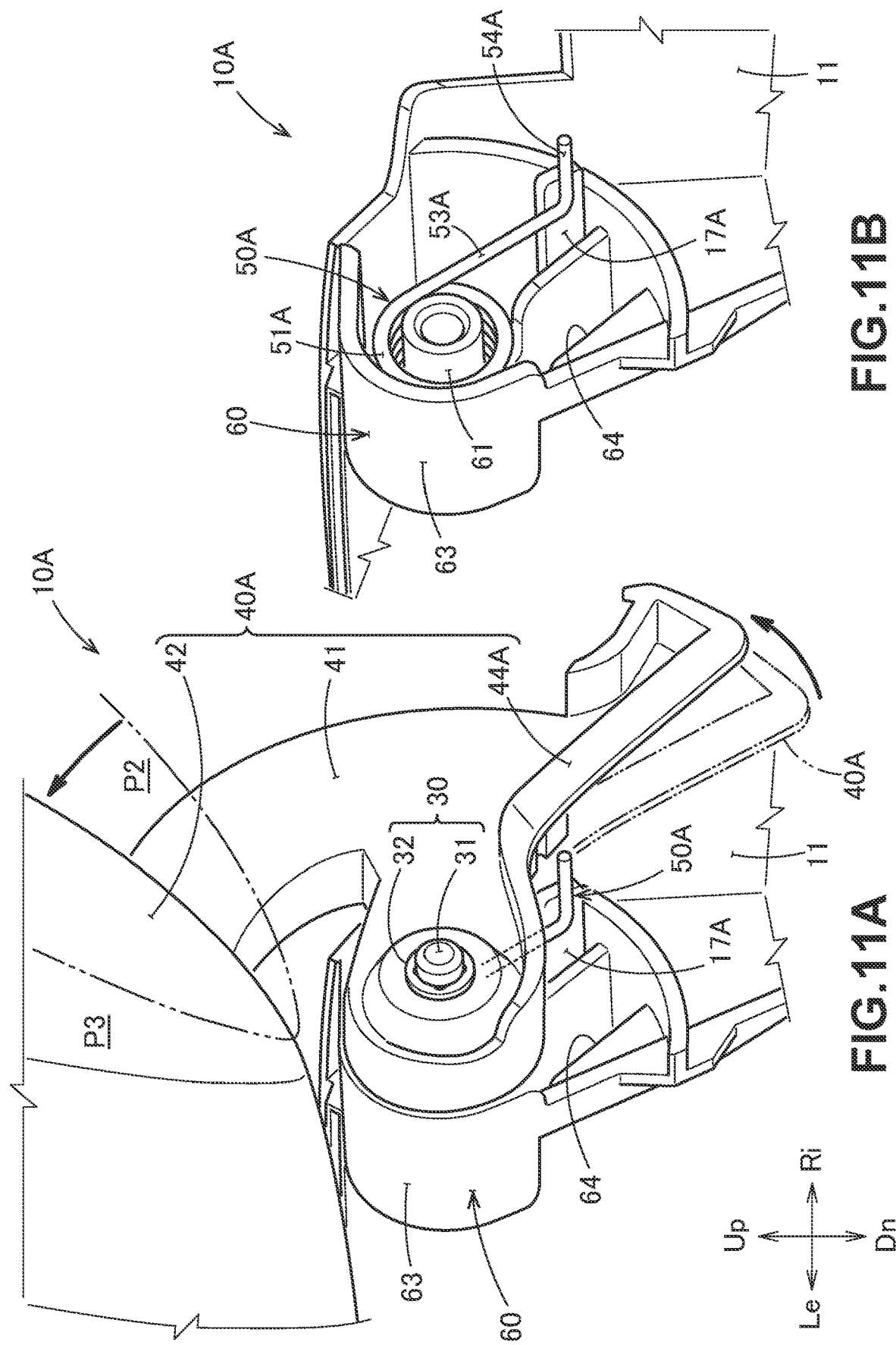

STORAGE DEVICE FOR VEHICLE

FIELD OF THE INVENTION

The present invention relates to a storage device for vehicle in which an occupant of a vehicle stores belongings and the like.

BACKGROUND OF THE INVENTION

Some vehicles are provided with a storage device for vehicle that stores belongings of an occupant. For example, a storage device for vehicle provided between a driver's seat and a passenger's seat of a passenger vehicle is referred to as a console box. As a technique relating to the console box in the related art, there is a technique disclosed in Japanese Application No. 2000-272426.

As illustrated in Japanese Application No. 2000-272426, the console box includes a console box main body of which an upper surface is open; a frame attached to the console box main body; a shaft supported by the frame; a console lid swingably supported by the shaft; and a spring that biases the console lid in an opening direction.

The console lid is opened from a fully closed position to a neutral position by a biasing force of the spring and is stopped at the neutral position by a stopper. In addition, the console lid can be opened from the neutral position to a fully open position by an operation performed by an occupant.

SUMMARY OF THE INVENTION

In the storage device for vehicle illustrated in Japanese Application No. 2000-272426, it is preferable that the number of components can be reduced from the viewpoint of facilitating assembly.

An object of the invention is to provide a storage device for vehicle in which the number of components is small.

According to the invention, there is provided a storage device for vehicle including: a storage portion of which one surface is an opening and which stores a storage item inside; a shaft portion provided in the storage portion; a lid swingably supported by the shaft portion to open and close at least a part of the opening; a coil spring that biases the lid in an opening direction; and a stopper integrally formed with the storage portion to restrict displacement of the coil spring when an opening degree of the lid reaches a predetermined opening degree.

According to the invention, it is possible to provide the storage device for vehicle in which the number of components is small.

BRIEF DESCRIPTION OF THE DRAWINGS

FIG. 3 is a view illustrating a state where a lid is removed from the storage device for vehicle illustrated in FIG. 2;

FIG. 7 is a perspective view of a storage device for vehicle according to a second embodiment;

FIG. 10A is a view describing the storage device for vehicle in which the lid is closed;

FIG. 10B is a view illustrating a state where the lid is removed from the storage device for vehicle illustrated in FIG. 10A;

FIG. 11A is a view describing the storage device for vehicle when the lid is displaced from a predetermined opening degree to a fully open position;

FIG. 11B is a view illustrating a state where the lid is removed from the storage device for vehicle illustrated in FIG. 11A;

DETAILED DESCRIPTION OF THE PREFERRED EMBODIMENTS

Figure 1:
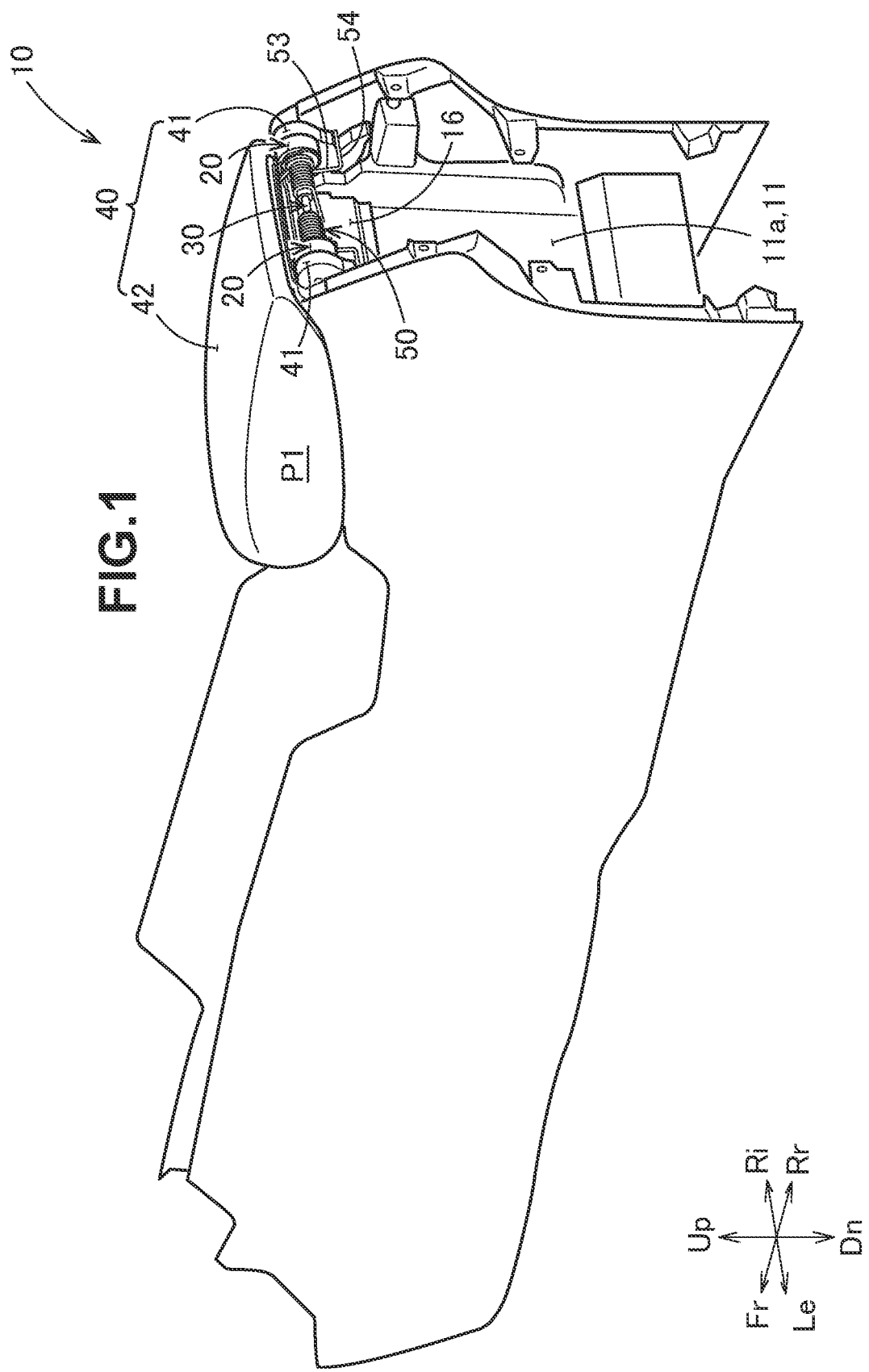
FIG. 1 is a perspective view of a storage device for vehicle according to a first embodiment.

Embodiments of the invention will be described below with reference to the accompanying drawings. Incidentally, in the description, left-right indicates left-right with reference to an occupant of a vehicle, and front-rear indicates front-rear with reference to a traveling direction of the vehicle. In addition, in the drawings, Fr represents the front, Rr represents the rear, Le represents the left when viewed from the occupant, Ri represents the right when viewed from the occupant, Up represents the top or up, and Dn represents the bottom or down.

First Embodiment

Figure 2:
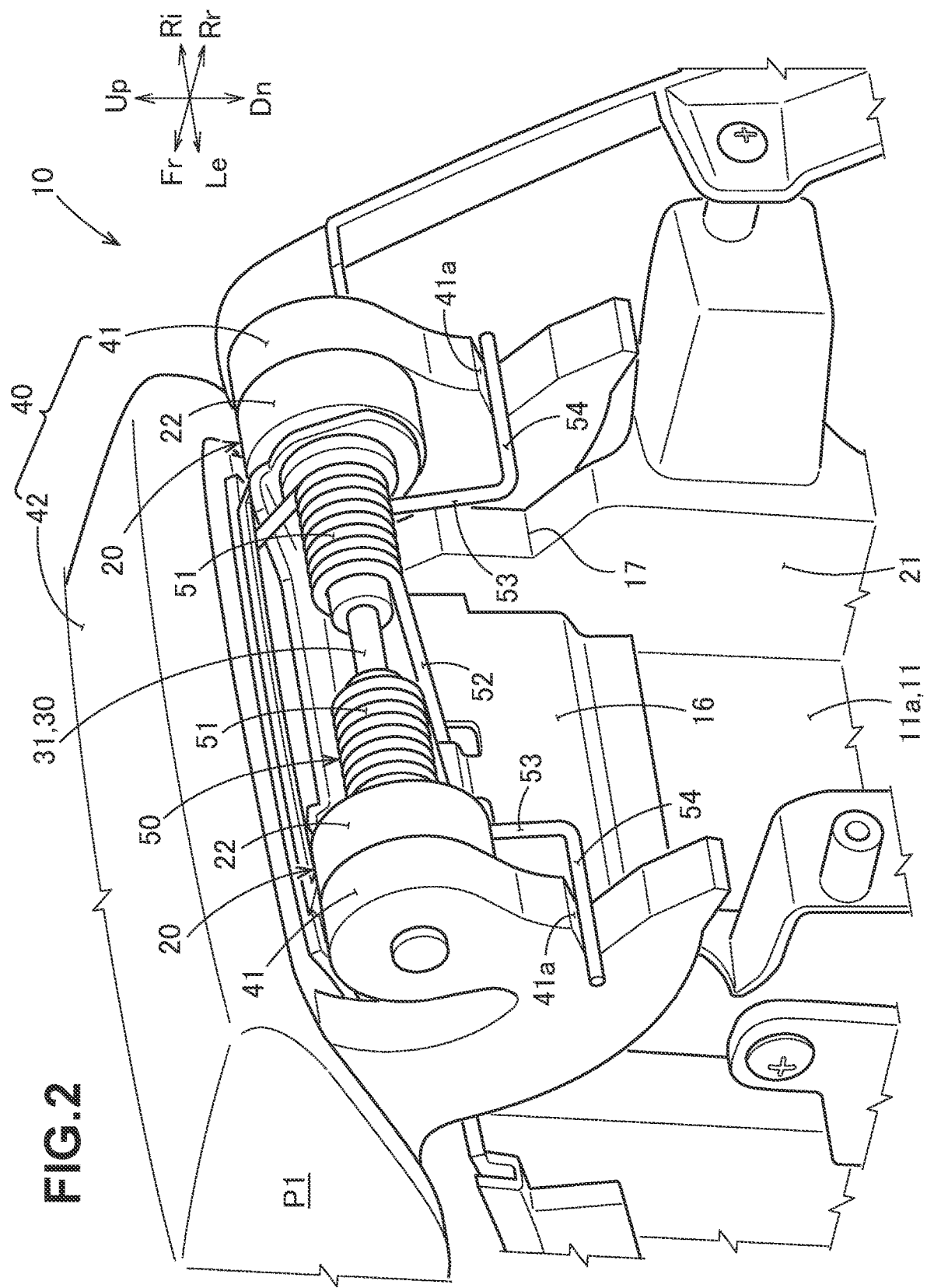
FIG. 2 is an enlarged view of main parts of the storage device for vehicle illustrated in FIG. 1.

Referring to FIG. 1 and FIG. 2, a storage device for vehicle 10 (hereinafter, abbreviated to a "storage device 10") is, for example, a center console provided between a driver's seat and a passenger's seat in a passenger compartment. Hereinafter, the center console will be described as one example of the storage device 10.

Referring to FIG. 2 and FIG. 3, the storage device 10 includes a storage portion 11 capable of storing belongings and the like (hereinafter, referred to as "storage items") of an occupant inside; a shaft portion 30 provided in the storage portion 11; a lid 40 swingably supported by the shaft portion 30 to be able to open and close at least a part of an opening; a coil spring 50 that biases the lid 40 in an opening direction; a fixing plate 16 that is a plate-shaped member fixed to the storage portion 11 and to which a part of the coil spring 50 is fixed; and a stopper 17 that restricts the displacement of the coil spring 50 when the opening degree of the lid 40 reaches a predetermined opening degree.

Figure 4:
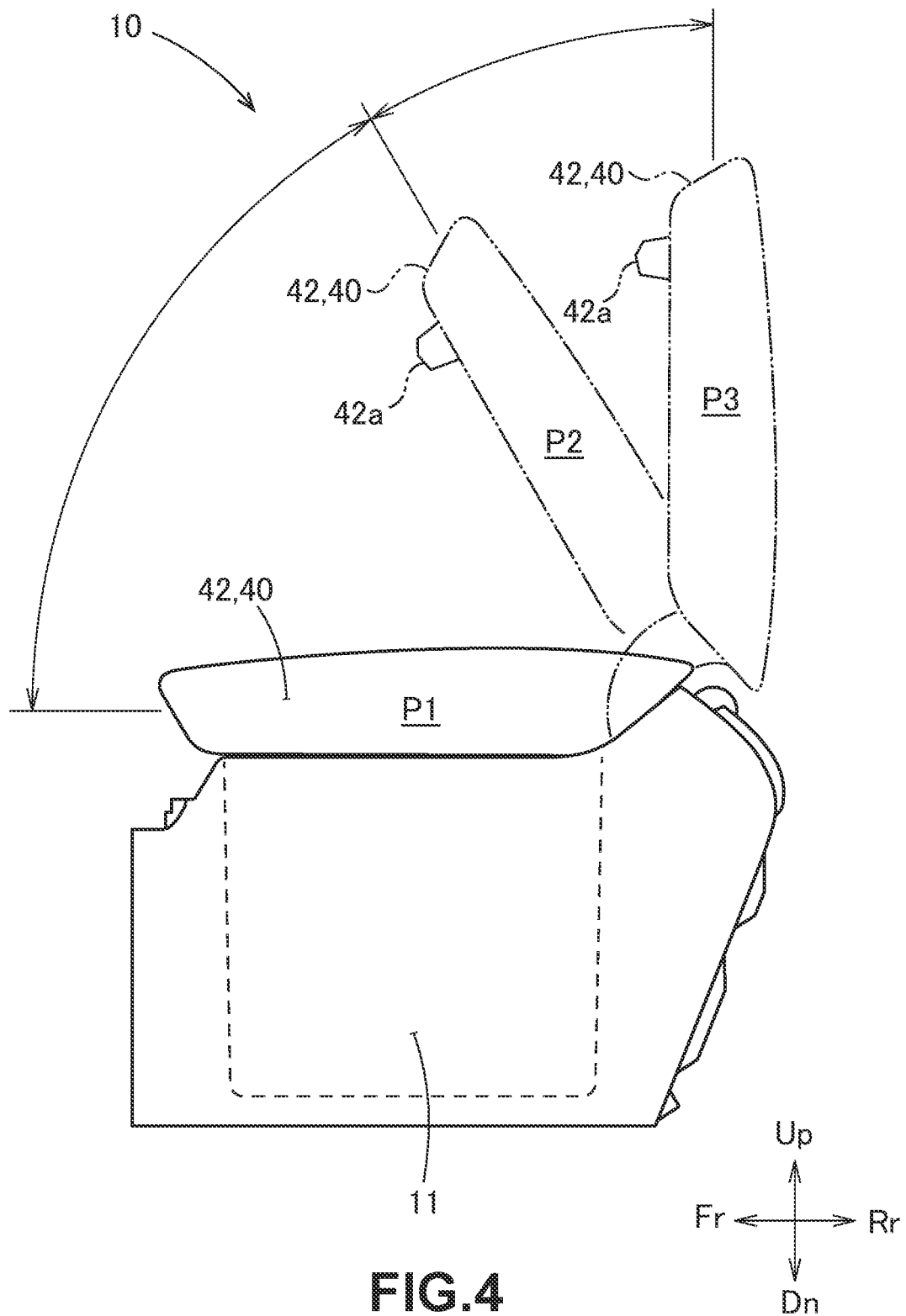
FIG. 4 is a view describing an action of the storage device for vehicle illustrated in FIG. 1.

Referring to FIG. 4, the storage portion 11 is a box-shaped resin molded article of which an upper surface is open. A front portion of the storage portion 11 is provided with a known lock mechanism that holds the lid 40 in a closed state.

Referring to FIG. 2 and FIG. 3, a bearing portions 20 that protrude rearward and support the shaft portion 30 is formed on a rear surface portion 11a that is a rear surface of the storage portion 11, at two left and right locations. The bearing portions 20 are integrally and continuously formed with the rear surface portion 11a.

The bearing portion 20 includes a base portion 21 that is continuous from the rear surface portion 11a and that extends up and down, and a bearing main body 22 which protrudes rearward from an upper end of the base portion 21 and through which the shaft portion 30 penetrates. The bearing main body 22 is formed in a substantially columnar shape.

Incidentally, the bearing portion 20 may be formed of a member separate from the storage portion 11.

The shaft portion 30 is formed of a shaft main body 31 having a round rod shape in which the diameter of a left end (one end) is formed large. A retainer that prevents the shaft main body 31 from coming off can be fitted to a right end of the shaft main body 31. The shaft main body 31 penetrates through the bearing main body 22.

Referring to FIG. 2, the lid 40 includes left and right lid arm portions 41 and 41 rotatably supported by the shaft portion 30, and a lid main body 42 provided at front ends of the lid arm portions 41 and 41 to be able to open and close the opening of the storage portion 11.

The lid arm portions 41 and 41 are provided outside the bearing portions 20 and 20 to face the bearing portions 20 and 20, respectively. The lid arm portions 41 and 41 are formed in a recessed shape along a biasing direction of the coil spring 50, and spring abutment portions 41a and 41a on which end portions of the coil spring 50 are capable of abutting are formed in the lid arm portions 41 and 41, respectively.

Incidentally, the lid arm portions 41 and 41 may be provided inside the bearing portions 20 and 20 to face the bearing portions 20 and 20, respectively.

Referring to FIG. 4, a front portion of the lid main body 42 is provided with a locking claw 42a that can be locked to the lock mechanism of the storage portion 11.

Referring to FIG. 2, the coil spring 50 is a helical torsion spring, and includes left and right winding portions 51 and 51 disposed on an outer periphery of the shaft portion 30 to be wound around an axis of the shaft portion 30; a spring fixing portion 52 that connects the winding portions 51 and 51 and that is fixed to the fixing plate 16; spring arm portions 53 and 53 extending from end portions of the winding portions 51 and 51 in a substantially tangential direction, respectively; and lid abutment portions 54 and 54 extending from tips of the spring arm portions 53 and 53 toward the lid arm portions 41 and 41 to be able to abut on the spring abutment portions 41a and 41a.

The spring fixing portion 52 has a substantially U shape extending forward, and a front end of the spring fixing portion 52 is fixed to the fixing plate 16. The spring fixing portion 52 does not rotate.

Referring to FIG. 3, the stopper 17 is integrally formed with the base portion 21 of the bearing portion 20. Namely, it can be said that the stopper 17 is integrally formed with the bearing portion 20, and it can be said that the stopper 17 is integrally formed with the storage portion 11. The stopper 17 is formed on a trajectory of the lid abutment portion 54 by causing the base portion 21 to be recessed forward in a substantially U shape. When the lid abutment portion 54 abuts on the stopper 17, the displacement of the coil spring 50 is restricted.

An action of the storage device 10 described above will be described.

Referring to FIG. 4, the storage device 10 is configured such that the lid 40 is opened from a fully closed position P1 to a position P2 at which the predetermined opening degree is reached, by a biasing force of the coil spring 50 (refer to FIG. 2). On the other hand, the occupant can hold the lid 40 with the hand and swing the lid 40 from the position P2 at which the predetermined opening degree is reached to a fully open position P3. Namely, the biasing force of the coil spring 50 does not act in an opening direction of the lid 40 from the position P2 at which the predetermined opening degree is reached to the fully open position P3.

When a state where the lid 40 is fully closed is defined as 0°, for example, the predetermined opening degree is 60°, and the full opening is 90°.

Figure 5A:
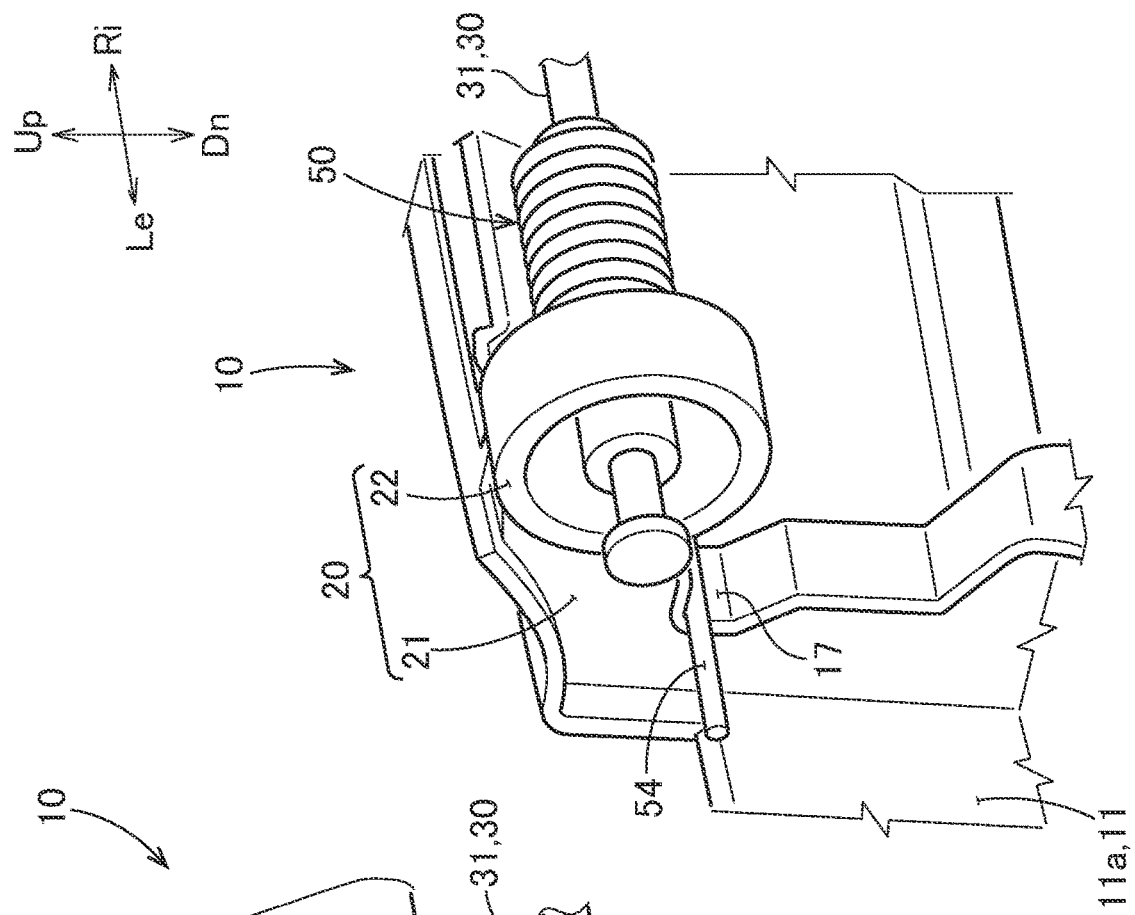
FIG. 5A is a view describing the storage device for vehicle in which the lid is opened to a predetermined opening degree.
Figure 5B:
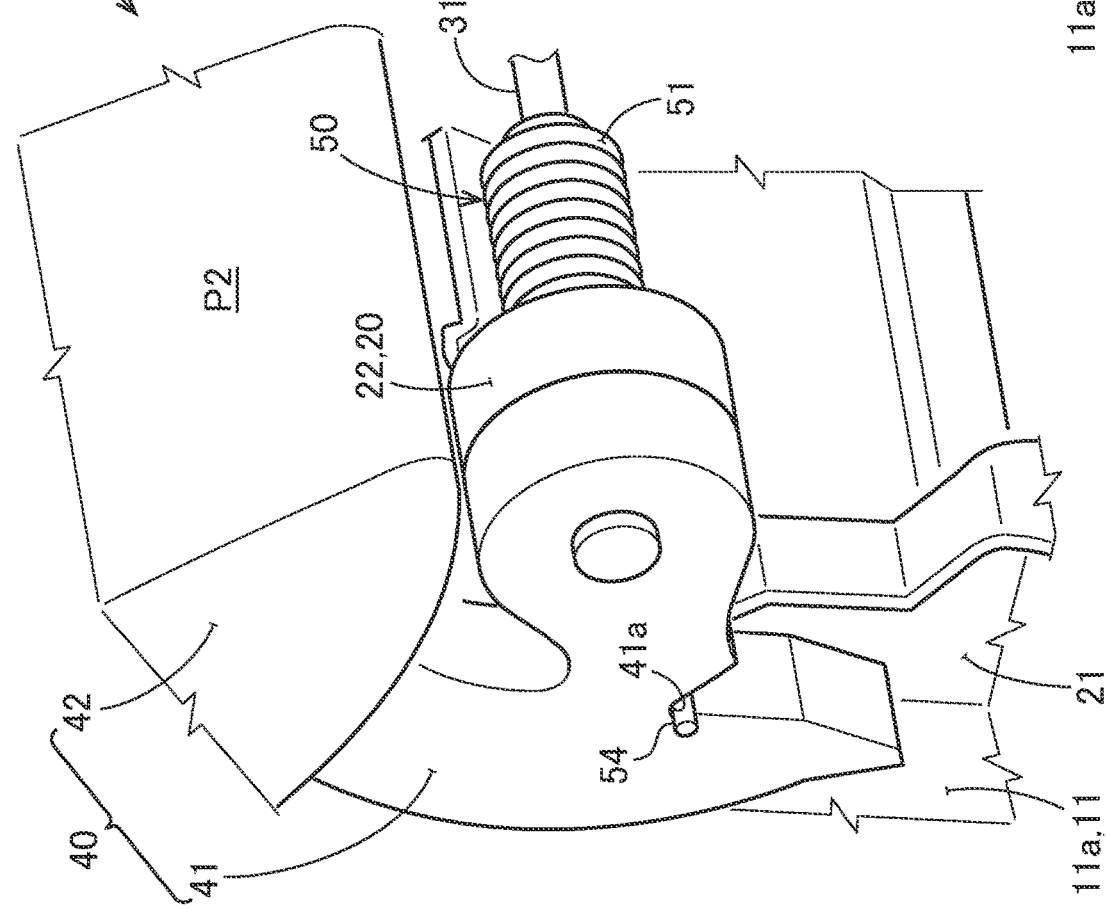
FIG. 5B is a view illustrating a state where the lid is removed from the storage device for vehicle illustrated in FIG. 5A.

Referring to FIG. 5A and FIG. 5B, when the lid 40 is at the predetermined opening degree, the lid abutment portion 54 abuts on the stopper 17. In other words, when the lid abutment portion 54 abuts on the stopper 17, the lid 40 is stopped at the predetermined opening degree. For this reason, the predetermined opening degree can be freely selected setting by a position at which the stopper 17 is formed.

Figure 6:
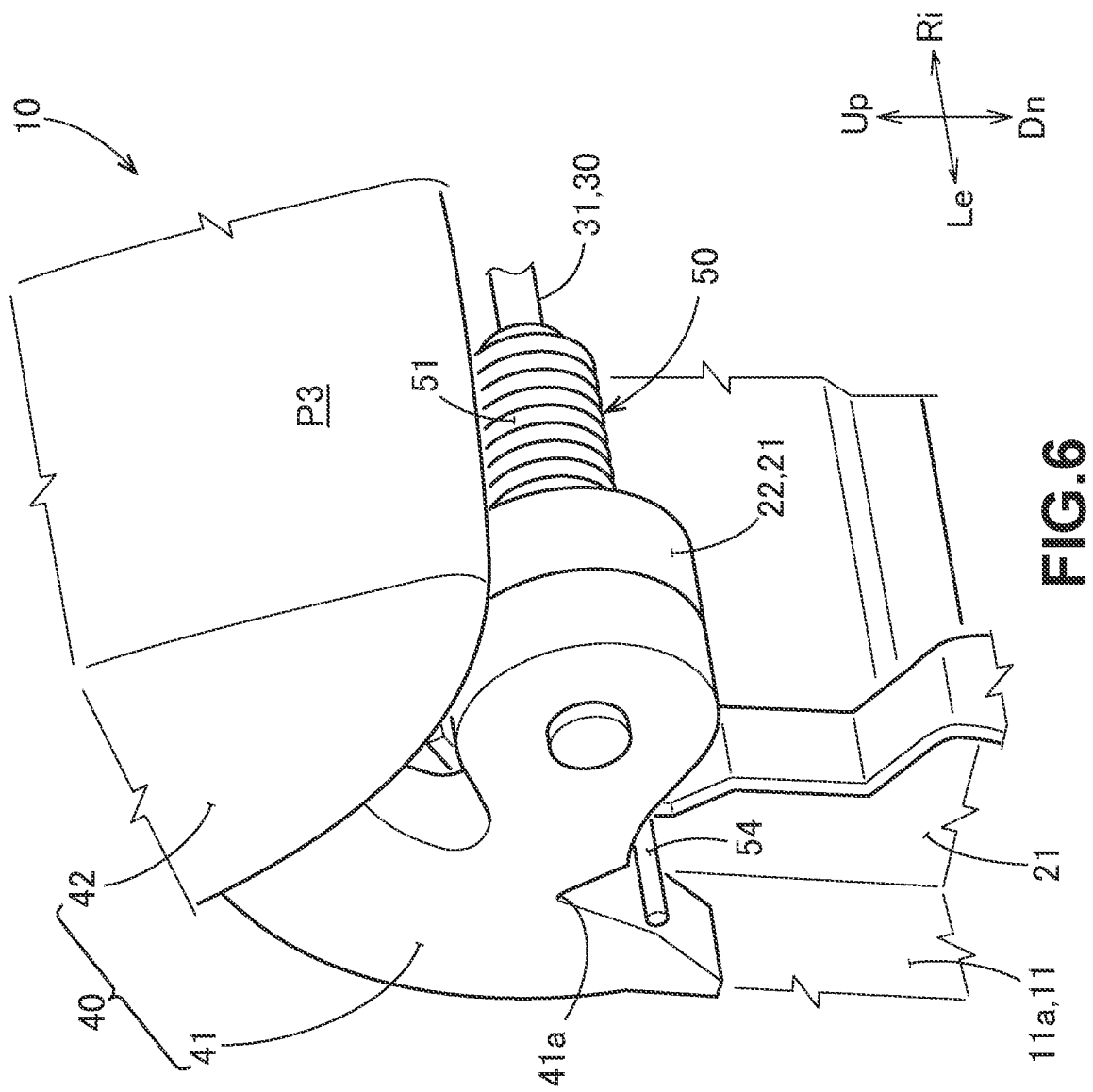
FIG. 6 is a view describing the storage device for vehicle in a fully open state.

Referring to FIG. 6, the occupant holds and rotates the lid 40 from the predetermined opening degree (refer to FIG. 5A) to a fully open state. When a force is applied in a rotation direction, the lid arm portion 41 is separated from the coil spring 50. Namely, the lid 40 can be rotated regardless of the biasing force of the coil spring 50.

Conversely, when the lid 40 is closed from a fully open state to a fully closed state, the occupant performs the entire operation. When the lid 40 is swung to the predetermined opening degree, the lid arm portion 41 abuts on the lid abutment portion 54. The occupant swings the lid 40 against the biasing force of the coil spring 50 from the predetermined opening degree to a fully closed state.

Incidentally, when the storage portion 11 and/or the lid 40 is provided with a damper, it is possible to open and close the lid 40 while damping the biasing force of the coil spring 50. In addition, when the damper is used, the lid 40 can be easily held at any position from the predetermined opening degree to the full opening. More specifically, a known rotary damper can be used as the damper.

Effects of the storage device 10 described above will be described below.

In the storage device 10, the stopper 17 that restricts the displacement of the coil spring 50 when the opening degree of the lid 40 reaches the predetermined opening degree is integrally formed with the storage portion 11. Since the stopper 17 is integrally formed with the storage portion 11, it is possible to reduce the number of components of the storage device 10. Further, since the stopper 17 is integrally formed with the storage portion 11, it is possible to achieve the simplification of the structure, space saving, and a reduction in weight.

In addition, generally, the storage portion 11 capable of storing storage items is the largest and heaviest component in the storage device 10. Since the stopper 17 is integrally formed with the storage portion 11 having high strength, the displacement of the coil spring 50 can be more reliably restricted.

The stopper 17 is integrally formed with the bearing portion 20 of the storage portion 11. Accordingly, the stopper 17 can be formed in the vicinity of a rotation axis.

Since the stopper 17 is formed in the vicinity of the rotation axis, it is possible to reduce the size of the storage device 10.

Second Embodiment

Next, a second embodiment of the invention will be described with reference to the drawings.

FIG. 7 illustrates a storage device 10A according to the second embodiment. Among configurations of the storage device 10A, parts that are common to the storage device 10 according to the first embodiment (refer to FIG. 1 and the like) use the same reference signs, and a detailed description thereof will be omitted.

Figure 8:
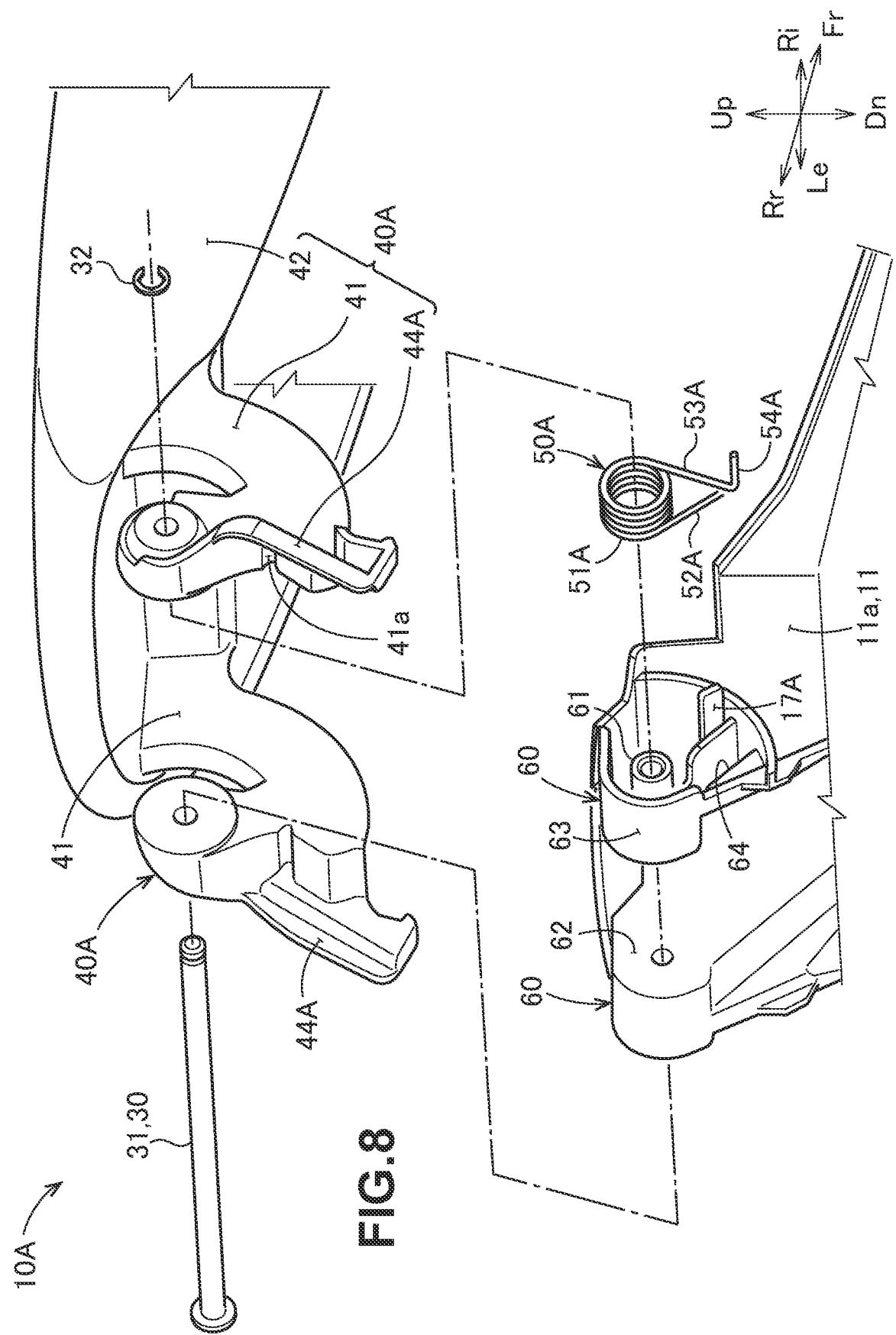
FIG. 8 is an exploded perspective view of the storage device for vehicle illustrated in FIG. 7.

Referring to FIG. 8, the storage device 10A includes bearing portions 60 integrally formed with a rear portion of the storage portion 11; a lid 40A swingably supported by the shaft portion 30 supported by the bearing portions 60; coil springs 50A that biases the lid 40A in an opening direction; and stoppers 17A integrally formed with the bearing portions 60 to restrict the displacement of the coil springs 50A when the lid 40A reaches the predetermined opening degree.

Figure 9:
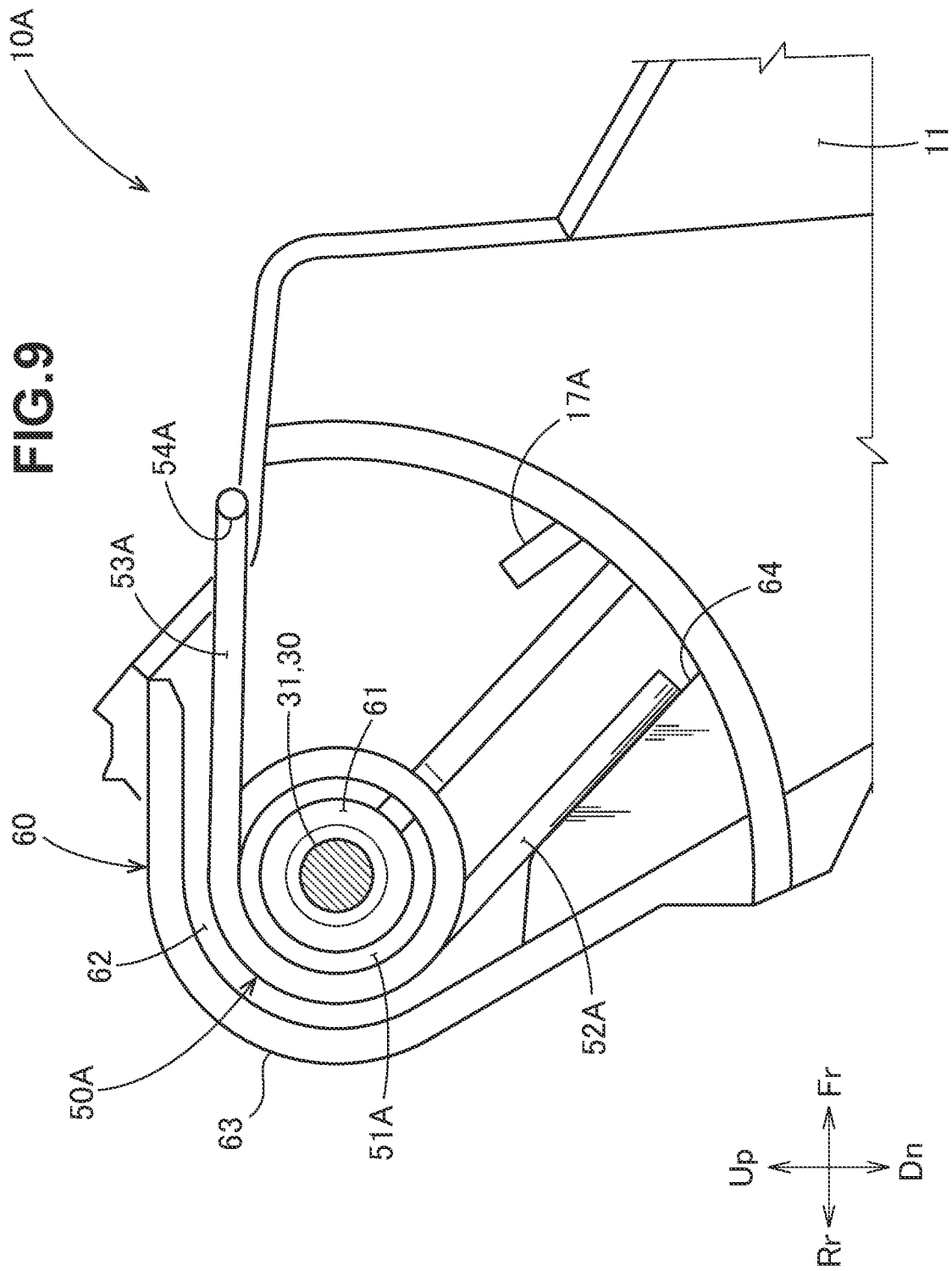
FIG. 9 is a side view of the storage device for vehicle with a lid removed.

Referring to FIG. 8 and FIG. 9, the bearing portion 60 includes a bearing main body 61 which is formed in a substantially cylindrical shape, through which the shaft portion 30 penetrates, and on an outer periphery of which the coil spring 50A is provided; a side wall portion 62 raised from the bearing main body 61 in a radial direction to face an inner surface (one end surface) of the coil spring 50A; an outer wall portion 63 extending from the side wall portion 62 along the bearing main body 61 to surround an outer periphery of the coil spring 50A; and a spring receiving portion 64 formed between the outer wall portion 63 and the bearing main body 61 to receive an end portion of the coil spring 50A.

The shaft portion 30 includes the shaft main body 31 penetrating through the bearing portions 60, and retainers 32 each having a substantially C shape which are fixed to tips of the shaft main body 31 to prevent the shaft main body 31 from coming off from the bearing portions 60.

A side surface of the lid arm portion 41 faces an outer end surface (the other end surface) of the coil spring 50A. The lid arm portions 41 and 41 may be provided outside the bearing portions 60 and 60 to face the bearing portions 60 and 60, respectively.

The coil spring 50A includes a winding portion 51A disposed on an outer periphery of the bearing main body 61 to be wound around an axis of the bearing main body 61; a spring fixing portion 52A extending from one end of the winding portion 51A to abut on the spring receiving portion 64; a spring arm portion 53A extending from the other end of the winding portion 51A in a substantially tangential direction; and a lid abutment portion 54A extending from a tip of the spring arm portion 53A toward the lid arm portion 41 to be able to abut on the spring abutment portion 41a.

The spring arm portion 53A and the lid abutment portion 54A are covered with a lid side wall portion 44A formed on an outer side surface of the lid arm portion 41. In other words, it can be said that the lid 40A includes the lid side wall portion 44A that covers the spring arm portion 53A extending from the winding portion 51A and that covers the lid abutment portion 54A extending from the spring arm portion 53A to be able to abut on the lid arm portion 41.

The stopper 17A extends from a position at which the stopper 17A is surrounded by the outer wall portion 63, to a trajectory of the coil spring 50A. The stopper 17A has a plate shape and is integrally formed with the bearing portion 60. Since the bearing portion 60 is integrally formed with the storage portion 11, it can also be said that the stopper 17A is integrally formed with the storage portion 11.

FIG. 10A and FIG. 10B illustrate the storage device 10A in a closed state. When the lid 40A is in a fully closed state, the coil spring 50A abuts only on the lid arm portion 41 and is separated from the stopper 17A. When the locking claw 42a (refer to FIG. 4) provided in the lid 40A is released from the lock mechanism in this state, because of a biasing force of the coil spring 50A, the lid arm portion 41 rotates, and the lid 40A rotates in the opening direction.

Referring to FIG. 11A and FIG. 11B, when the lid 40A rotates to the predetermined opening degree P2, the coil spring 50A abuts on the stopper 17A, and the rotation of the lid 40A is stopped (refer to the lid 40A illustrated by alternate long and two short dashes lines in FIG. 11A). Both the spring arm portion 53A and the lid abutment portion 54A abut on the stopper 17A.

The occupant can hold and rotate the lid 40A from the predetermined opening degree P2 to the fully open position P3. At this time, the coil spring 50A remains abutting on the stopper 17A. Namely, the lid arm portion 41 rotates from the predetermined opening degree P2 to the fully open position P3 in a state where the lid arm portion 41 is separated from the coil spring 50A.

Conversely, when the lid 40A is closed from the fully open state P3 to the fully closed state P1, the occupant performs the entire operation. When the lid 40A is swung to the predetermined opening degree P2, the lid arm portion 41 abuts on the lid abutment portion 54A. The occupant swings the lid 40A against the biasing force of the coil spring 50A from the predetermined opening degree P2 to the fully closed state P1.

The storage device 10A described above also exhibits the predetermined effects of the invention.

Referring to FIG. 8, further, the coil spring 50A is provided between the bearing portion 60 and the lid arm portion 41. Accordingly, a space can be secured between the bearing portion 60 and the bearing portion 60 (or, between the lid arm portion 41 and the lid arm portion 41 when the lid arm portion 41 is disposed inside). Other components can be disposed in the empty space, and the passenger compartment space can be effectively used.

In addition, the outer periphery of the coil spring 50A is surrounded by the bearing portion 60 and the lid arm portion 41. It is possible to suppress defects generated due to dust being caught in the coil spring 50A. In addition, it is possible to improve the external appearance of the storage device 10A. When the spring arm portion 53A and the lid abutment portion 54A are covered with the lid side wall portion 44A, it is possible to further improve the effect, which is more preferable.

Third Embodiment

Next, a third embodiment of the invention will be described with reference to the drawings.

Figure 12B:
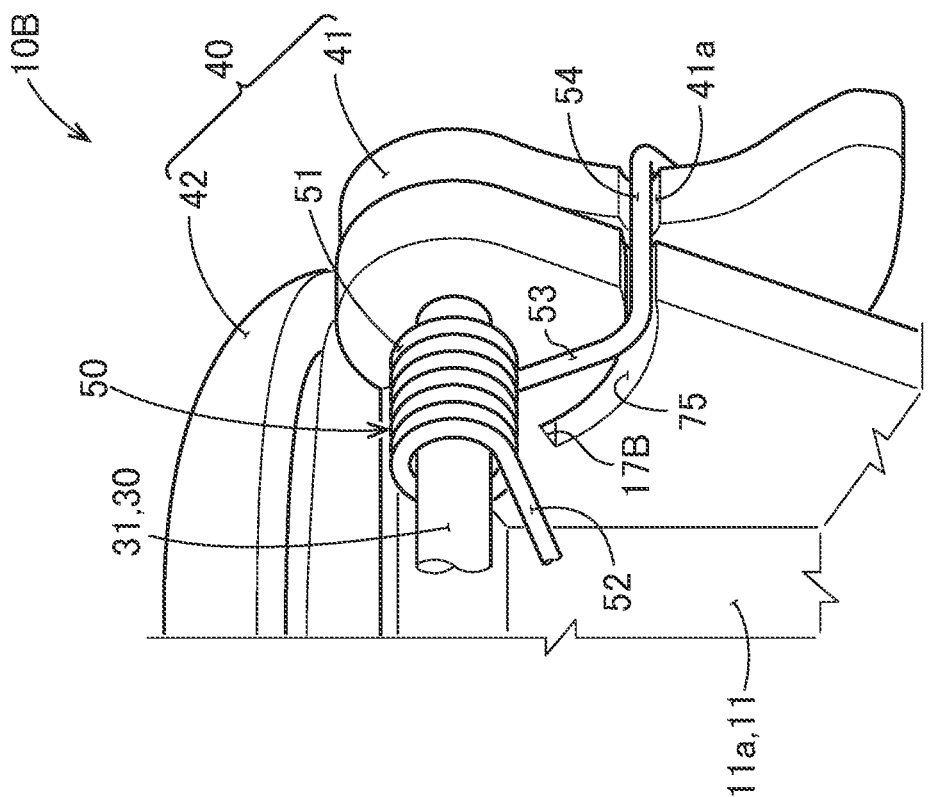
FIG. 12B is an enlarged view of main parts illustrated in FIG. 12A.
Figure 12A:
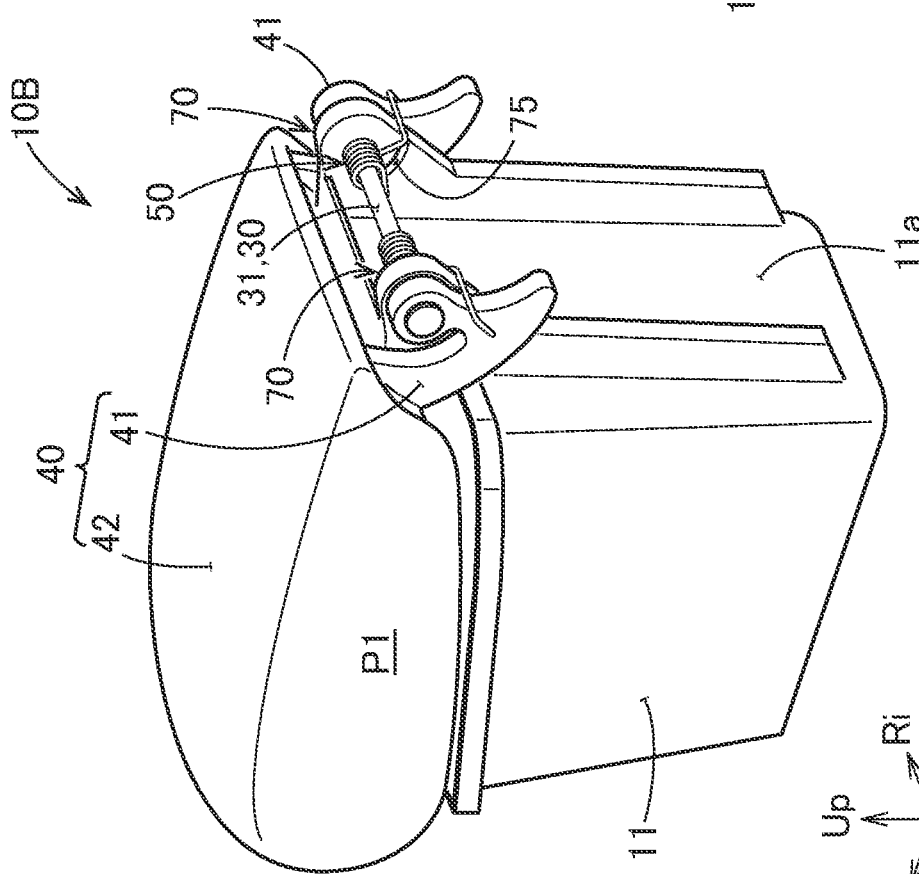
FIG. 12A is a perspective view of a storage device for vehicle according to a third embodiment.

FIG. 12A illustrates a storage device 10B according to the third embodiment. Among configurations of the storage device 10B, parts that are common to the storage device 10 according to the first embodiment and/or the second embodiment (refer to FIG. 1 and the like) use the same reference signs, and a detailed description thereof will be omitted.

Referring to FIG. 12B, the storage device 10B includes bearing portions 70 integrally formed with a rear portion of the storage portion 11. A slit 75 is formed in the bearing portion 70 along the trajectory of the coil spring 50. An end portion of the slit 75 serves as a stopper 17B that restricts the displacement of the coil spring 50 when the opening degree of the lid 40 reaches the predetermined opening degree.

Figure 13B:
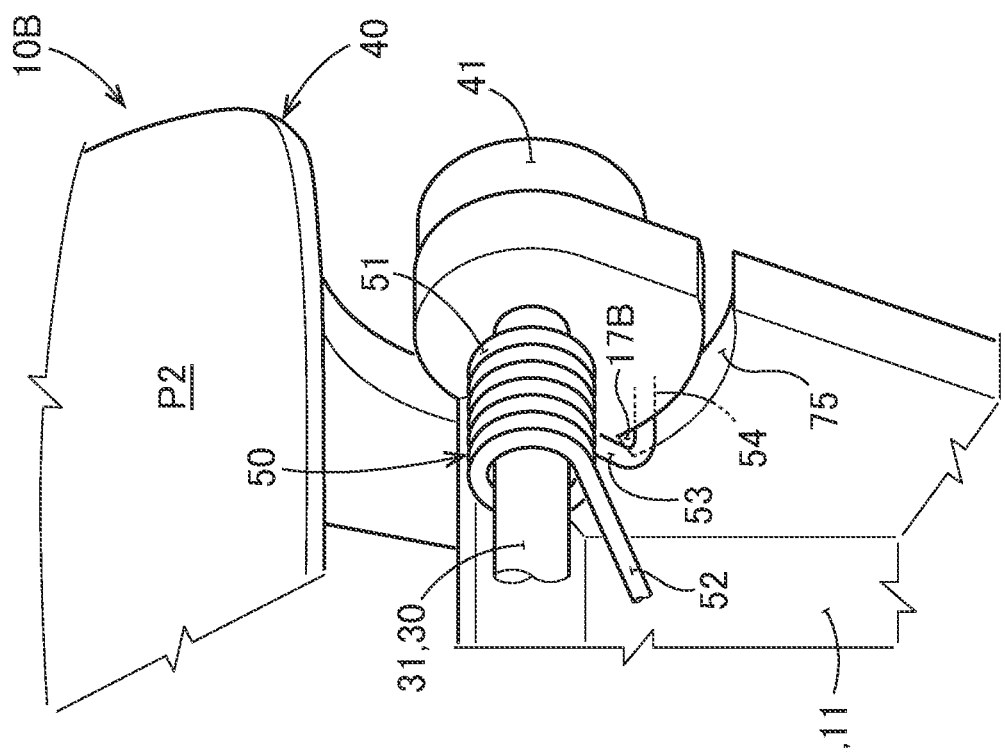
FIG. 13B is an enlarged view of main parts illustrated in FIG. 13A.
Figure 13A:
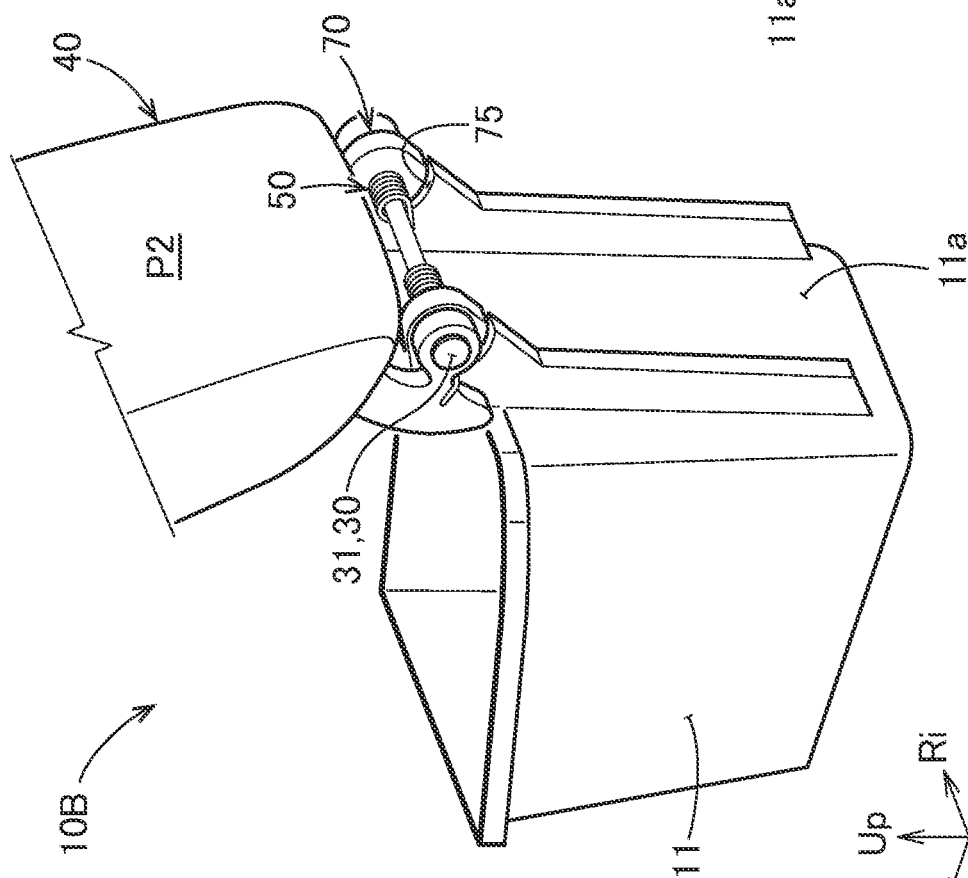
FIG. 13A is a view describing the storage device for vehicle in which a lid is in a fully open state.

Referring to FIG. 13A and FIG. 13B, when the locking of the lid 40 in a fully closed state is released, the coil spring 50 rotates along the slit 75. Accordingly, the lid 40 rotates and opens an upper side of the storage portion 11. When the opening degree of the lid 40 reaches the predetermined opening degree, the coil spring 50 reaches the end portion of the slit 75. When the coil spring 50 abuts on the stopper 17B formed at the end portion of the slit 75, the displacement of the coil spring 50 is restricted.

The storage device 10B described above also exhibits the predetermined effects of the invention.

Further, the slit 75 is formed in the bearing portion 70 along the trajectory of the coil spring 50, and the end portion of the slit 75 serves as the stopper 17B. Since the stopper 17B is formed using the slit 75, the storage device 10B can be compactly made.

Incidentally, the center console has been described as an example of the storage device, but the invention is applicable to a glove box and the like. The invention is not limited to the embodiments as long as the actions and effects of the invention are exhibited.

What is claimed is:

1. A storage device for a vehicle, comprising:
   a storage portion of which one surface is an opening and which stores a storage item inside;
   a shaft portion provided in the storage portion;
   a lid swingably supported by the shaft portion to open and close at least a part of the opening;
   a coil spring that biases the lid in an opening direction;
   a stopper integrally formed with the storage portion to restrict displacement of the coil spring when an opening degree of the lid reaches a predetermined opening degree;
   a bearing portion integrally formed with the storage portion to support the shaft portion; and
   a lid arm portion that is a part of the lid and that is supported by the shaft portion,
   wherein the coil spring is provided between the bearing portion and the lid arm portion;
   wherein the bearing portion comprises a bearing main body which is formed in a substantially cylindrical shape, through which the shaft portion penetrates, and on an outer periphery of which the coil spring is provided, a side wall portion raised from the bearing main body in a radial direction to face one end surface of the coil spring, and an outer wall portion extending from the side wall portion along the bearing main body to surround an outer periphery of the coil spring, and
   the lid arm portion faces the other end surface of the coil spring.

2. A storage device for a vehicle, comprising:
   a storage portion of which one surface is an opening and which stores a storage item inside;
   a shaft portion provided in the storage portion;
   a lid swingably supported by the shaft portion to open and close at least a part of the opening;
   a coil spring that biases the lid in an opening direction;
   a stopper integrally formed with the storage portion to restrict displacement of the coil spring when an opening degree of the lid reaches a predetermined opening degree;
   a bearing portion integrally formed with the storage portion to support the shaft portion; and
   a lid arm portion that is a part of the lid and that is supported by the shaft portion,
   wherein a slit is formed in the bearing portion along a trajectory of the coil spring, and
   an end portion of the slit serves as the stopper.

* * * * *